(12) United States Patent
Lee et al.

(10) Patent No.: US 11,333,607 B2
(45) Date of Patent: May 17, 2022

(54) FLUORESCENT SIGNAL DETECTION APPARATUS USING DIAGNOSTIC KIT

(71) Applicants: ELECTRONICS AND TELECOMMUNICATIONS RESEARCH INSTITUTE, Daejeon (KR); YD Diagnostics Co., Ltd., Yongin (KR)

(72) Inventors: Dae-Sik Lee, Daejeon (KR); Mi Ran Kang, Seoul (KR); Sung Mo Hwang, Suwon (KR); Jae Ki Sim, Daejeon (KR)

(73) Assignees: ELECTRONICS AND TELECOMMUNICATIONS RESEARCH INSTITUTE, Daejeon (KR); YD Diagnostics Co., Ltd., Yongin (KR)

( * ) Notice: Subject to any disclaimer, the term of this patent is extended or adjusted under 35 U.S.C. 154(b) by 168 days.

(21) Appl. No.: 16/591,071

(22) Filed: Oct. 2, 2019

(65) Prior Publication Data

US 2020/0103348 A1 Apr. 2, 2020

(30) Foreign Application Priority Data

Oct. 2, 2018 (KR) .................. 10-2018-0117898
Sep. 3, 2019 (KR) .................. 10-2019-0108916

(51) Int. Cl.
*G01N 21/64* (2006.01)
*G01N 21/59* (2006.01)

(52) U.S. Cl.
CPC ......... *G01N 21/6458* (2013.01); *G01N 21/59* (2013.01); *G01N 21/6486* (2013.01); *G01N 2021/6419* (2013.01)

(58) Field of Classification Search
CPC ... G01N 2021/6419; G01N 2021/7759; G01N 2021/7786; G01N 2021/7796;
(Continued)

(56) References Cited

U.S. PATENT DOCUMENTS 8,797,536 B2    8/2014   Lee et al.
10,078,069 B2   9/2018   Hwang et al.
(Continued)

FOREIGN PATENT DOCUMENTS

JP        2557650 B2      11/1996
KR    20140090184 A       7/2014
(Continued)

OTHER PUBLICATIONS

Mudanyali, et al., "Integrated Rapid-Diagnostic-Test Reader Platform on a Cellphone," Lab Chip, 2012, vol. 12 (15), pp. 2678-2686.

*Primary Examiner* — Sunghee Y Gray

(57) ABSTRACT

Provided is a fluorescent signal detection apparatus including a reaction unit including a kit loading part in which a diagnostic kit is inserted to one area, a light source unit including a light source and a first barrel configured to surround the light source, a light receiving unit provided at one side of the light source unit and including a detection part and a second barrel configured to surround the detection part, and a case configured to surround the reaction unit, the light source unit, and the light receiving unit. Here, the diagnostic kit includes measuring parts and microstructures configured to accommodate a target to be measured, which is labeled by a fluorescent dye, and the microstructures are provided on the measuring parts.

9 Claims, 9 Drawing Sheets

(58) Field of Classification Search
CPC .. G01N 21/59; G01N 21/645; G01N 21/6458; G01N 21/6486; G01N 21/8483; G01N 2201/0221
USPC .......................................................... 356/436
See application file for complete search history.

(56) References Cited

U.S. PATENT DOCUMENTS

| | | | |
|---|---|---|---|
| 10,088,412 | B2 | 10/2018 | Lee et al. |
| 10,100,338 | B2 | 10/2018 | Scott et al. |
| 10,352,819 | B2 | 7/2019 | Choi et al. |
| 2013/0020506 | A1 | 1/2013 | Gruler |
| 2013/0136671 | A1* | 5/2013 | Li ............................ F04F 1/18 422/505 |
| 2018/0088030 | A1* | 3/2018 | Lee .................... G01N 21/8483 |
| 2019/0329246 | A1* | 10/2019 | Akiyama ............. G01N 33/558 |

FOREIGN PATENT DOCUMENTS

| | | |
|---|---|---|
| KR | 101609029 B1 | 4/2016 |
| KR | 20180072369 A | 6/2018 |
| WO | WO2013119266 A1 | 8/2013 |

\* cited by examiner

FLUORESCENT SIGNAL DETECTION APPARATUS USING DIAGNOSTIC KIT

CROSS-REFERENCE TO RELATED APPLICATIONS

This U.S. Non-Provisional Patent Application claims priority under 35 U.S.C. § 119 of Korean Patent Application Nos. 10-2018-0117898, filed on Oct. 2, 2018, and 10-2019-0108916, filed on Sep. 3, 2019, the entire contents of which are hereby incorporated by reference.

BACKGROUND

The present disclosure herein relates to a fluorescent signal detection apparatus, and more particularly, to a portable fluorescent signal detection apparatus capable of performing a quantitative analysis using a diagnostic kit.

A simple test reagent or a diagnostic kit is used to perform various examinations in a short time, e.g., checking whether a pathogen such as viruses and bacteria exists, a pregnancy test, and a cancer specific market detection. The above-described examinations use a feature in which an examination target material and a reaction material are specifically reacted with each other. The specific reaction may be measured through, e.g., a rapid diagnostic test (RDT) method. The rapid diagnostic test (RDT) method includes an immuno-chromatography method such as a flow immunoassay (FIA) and a lateral flow assay (LFA), and a dipstick analysis method. The immuno-chromatography method, which is frequently used for detecting various examination target materials, is generally performed through a qualitative analysis that only checks whether an antigen exists. However, in recent years, the qualitative analysis with reproducibility and safety improved has been tried in various ways.

SUMMARY

The present disclosure provides a portable fluorescent signal detection apparatus capable of performing a quantitative analysis.

The object of the present invention is not limited to the aforesaid, but other objects not described herein will be clearly understood by those skilled in the art from descriptions below.

An embodiment of the inventive concept provides a fluorescent signal detection apparatus including: a reaction unit including a kit loading part in which a diagnostic kit is inserted to one area; a light source unit including a light source and a first barrel configured to surround the light source; a light receiving unit provided at one side of the light source unit and including a detection part and a second barrel configured to surround the detection part; and a case configured to surround the reaction unit, the light source unit, and the light receiving unit. Here, the diagnostic kit includes measuring parts and microstructures configured to accommodate a target to be measured, which is labeled by a fluorescent dye, and the microstructures are provided on the measuring parts.

In an embodiment, the fluorescent dye may include one of europium (Eu), samarium (Sm), terbium (Tb), and ruthenium (Ru).

In an embodiment, the measuring parts may each extend in a first direction, and be spaced apart from each other in a second direction perpendicular to the first direction, and the microstructures may have different shapes for each of the measuring parts.

In an embodiment, the detection part may be provided in plurality, and the plurality of detection parts may be spaced apart from each other in the first direction.

In an embodiment, the light receiving unit may be provided in a direction perpendicular to a top surface of the diagnostic kit.

In an embodiment, the case may include a top surface and a bottom surface opposite to the top surface, the top surface may include a flat surface and an inclined surface connected to the flat surface, and one of the light source unit and the light receiving unit may be provided at the inclined surface.

In an embodiment, the light receiving unit may be provided at the inclined surface, and each of a top surface of the diagnostic kit and a top surface of the kit loading part may have an inclination angle with the bottom surface of the case.

In an embodiment, the inclination angle may be about 5° to about 45°.

In an embodiment, the fluorescent signal detection apparatus may further include at least one of a first filter in the first barrel and a second filter in the second barrel.

In an embodiment, the second filter may be one of a high pass filter configured to transmit light having a wavelength of about 590 nm or more and a band pass filter configured to transmit light having a wavelength of about 590 nm to about 650 nm.

In an embodiment, the fluorescent signal detection apparatus may further include: an amplification unit configured to amplify an analog signal incident to the light receiving unit; a conversion unit configured to convert the analog signal into a digital signal; a control unit configured to control the digital signal; and a display unit configured to display the digital signal.

In an embodiment of the inventive concept, a fluorescent signal detection apparatus includes: a case surrounded by a top surface and a bottom surface opposite to the top surface; a light source unit provided at the top surface and including a light source configured to emit an incident beam; a reaction unit which is provided on the bottom surface and in which a diagnostic kit configured to reflect the incident beam as a reflected beam is inserted; and a light receiving unit spaced apart from the light source unit on the top surface and including a detection part into which the reflected beam is incident. Here, the diagnostic kit includes microstructures to which a target to be measured, which is labeled by a fluorescent dye, is provided, the microstructures are arranged in one direction to provide a microstructure array, the microstructure array is provided in plurality, and the plurality of microstructure arrays are spaced apart from each other in a direction perpendicular to the one direction.

In an embodiment, the fluorescent dye may include one of europium (Eu), samarium (Sm), terbium (Tb), and ruthenium (Ru).

In an embodiment, the light source unit may further include a first barrel provided on a path of the incident beam and a first filter provided in the first barrel, and the light receiving unit may further include a second barrel provided on a path of the reflected beam and a second filter provided in the second barrel.

In an embodiment, the first filter may transmit light in a wavelength range of about 350 nm to about 390 nm with a transmittance of about 80% or more, and the second filter may transmit light in a wavelength range of about 590 nm or more with a transmittance of about 80% or more.

In an embodiment, the reaction unit may further include a kit loading part in which the diagnostic kit is inserted into one area, each of the case, the kit loading part, and the first and second barrels may be made of a material without autofluorescence, and an anti-reflection coating may be performed on a top surface of the kit loading part and an inner surface of each of the first and second barrels.

In an embodiment, the top surface of the case may include an inclined surface at one area, which has an inclination with respect to the bottom surface, and one of the light source unit and the light receiving unit may be provided at the inclined surface.

In an embodiment, the light receiving unit may be provided at the inclined surface, a top surface of the diagnostic kit may have an inclination angle with the bottom surface of the case, and the inclination angle may be about 5° to about 45°.

In an embodiment, the microstructure arrays may have the different shapes from each other, and the incident beam may be reflected in different directions according to the shapes of the microstructure arrays.

In an embodiment, the fluorescent signal detection apparatus may further include: an amplification unit configured to amplify an analog signal incident to the light receiving unit; a conversion unit configured to convert the analog signal into a digital signal; a control unit configured to control the digital signal; and a display unit configured to display the digital signal.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
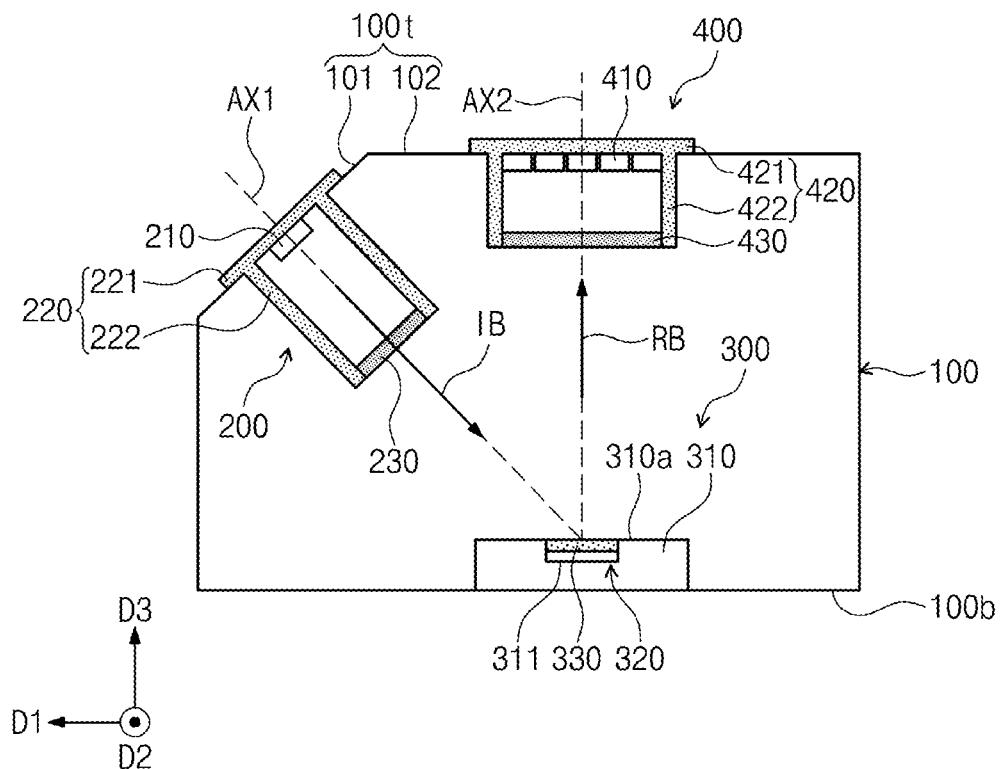
FIG. 1A is a cross-sectional view for explaining a fluorescent signal detection apparatus according to an embodiment of the inventive concept.

Exemplary embodiments of the present invention will be described with reference to the accompanying drawings so as to sufficiently understand constitutions and effects of the present invention.

The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In the figures, the dimensions of layers and regions are exaggerated for clarity of illustration. Also, the relative sizes between elements may be exaggerated for further understanding of the present invention.

In the following description, the technical terms are used only for explaining a specific exemplary embodiment while not limiting the present disclosure. Unless terms used in embodiments of the present invention are differently defined, the terms may be construed as meanings that are commonly known to a person skilled in the art.

The terms of a singular form may include plural forms unless referred to the contrary. The meaning of 'comprises' and/or 'comprising' specifies a component, a step, an operation and/or an element does not exclude other components, steps, operations and/or elements.

It will also be understood that when a layer is referred to as being "on" another layer or substrate, it can be directly on the other layer or substrate, or intervening layers may also be present.

It will be understood that although the terms first and second are used herein to describe various elements, these elements should not be limited by these terms. These terms are used only to discriminate one region or layer from another region or layer. Therefore, a portion referred to as a first portion in one embodiment can be referred to as a second portion in another embodiment. An embodiment described and exemplified herein includes a complementary embodiment thereof. Like reference numerals refer to like elements throughout. Hereinafter, exemplary embodiments of a fluorescent signal detection apparatus will be described in detail with reference to FIGS. 1A to 6.

Figure 1B:
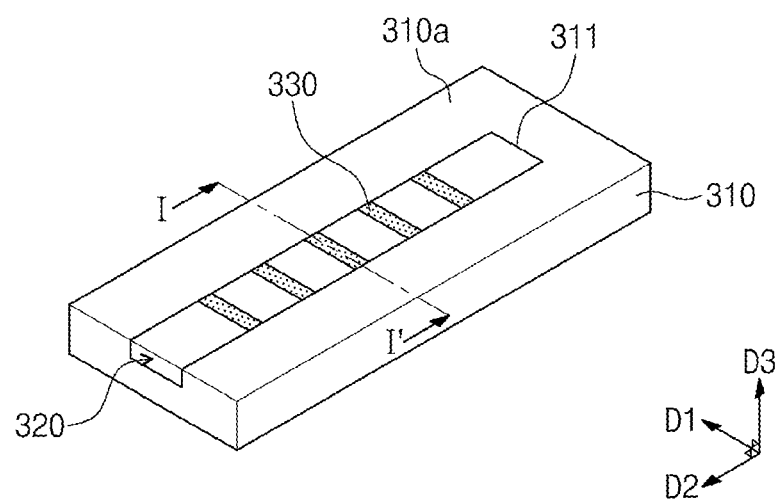
FIG. 1B is a perspective view for explaining a reaction unit of the fluorescent signal detection apparatus according to an embodiment of the inventive concept.

FIG. 1A is a cross-sectional view for explaining a fluorescent signal detection apparatus according to an embodiment of the inventive concept. FIG. 1B is a perspective view for explaining a reaction unit of the fluorescent signal detection apparatus according to an embodiment of the inventive concept.

Referring to FIGS. 1A and 1B, a fluorescent signal detection apparatus 10 according to an embodiment of the inventive concept may include a case 100, a light source unit 200, a reaction unit 300, and a light receiving unit 400.

The case 100 may be surrounded by a top surface 100t, a bottom surface 100b, and a side surface connecting the top surface 100t and the bottom surface 100b. The top surface 100t may include an inclined surface 101 and a flat surface 102. The inclined surface 101 may provide a predetermined angle with a first direction D1. Each of the flat surface 102 and the bottom surface 100b may be a plane extending in the first direction D1 and a second direction D2. The second direction D2 may be perpendicular to the first direction D1. The case 100 may be a dark room surrounded by the inclined surface 101, the flat surface 102, the bottom surface 100b, and the side surface. The case 100 may have a low reflectance and be made of a material without autofluorescence. For example, the case 100 may be made of plastic or metal. For example, the case 100 may be provided through methods such as a three-dimensional (3D) printing, an injection molding, or a hot embossing.

The light source unit 200 may be provided at the inclined surface 101 of the case 100. The light source unit 200 may include a light source 210, a first barrel 220, and a first filter 230. The first barrel 220 may include a first portion 221 and a second portion 222. The first barrel 220 may be symmetric with respect to a first axis AX1. The first portion 221 may be provided on the inclined surface 101. The second portion 222 may be connected to the first portion 221. The second portion 222 may pass through the inclined surface 101 and extend in parallel to the first axis AX1. The first portion 221 may have a plate shape, and the second portion 222 may have a hollow column shape. The first barrel 220 may have a low reflectance and be made of a material without autofluorescence. Also, the first barrel 220 may have an inner surface that is processed so that light is not reflected or scattered. For example, an anti-reflection coating is performed on the inner surface of the first barrel 220. Thus, an incident beam IB may have a high uniformity. The first barrel 220 may guide a path of the incident beam IB. More particularly, as a length of the second portion 222 or a diameter of a space surrounded by the first portion 221 and the second portion 222 is adjusted, a size, shape, and uniformity of the incident beam IB may be adjusted.

The light source 210 may be provided on the first portion 221 of the first barrel 220. The light source 210 may be provided in the space surrounded by the first portion 221 and the second portion 222. The light source 210 may meet the first axis AX1. The light source 210 may be a laser diode (LD) or a light emitting diode (LED). The light source 210 may emit light in a preset wavelength range. The preset wavelength range may be a first wavelength range. The first wavelength range may be different according to the kind of a fluorescent material used by the fluorescent signal detection apparatus 10. For example, when the fluorescent signal detection apparatus 10 uses europium (Eu), the first wavelength range may be about 350 nm to about 390 nm. Also, the light source 210 may have an output equal to or less than a preset maximum output. As the output of the light source 210 is restricted, a material to be measured may be prevented from being destroyed. The incident beam IB emitted from the light source 210 may travel in the first barrel 220.

The first filter 230 may be provided at a position at which extension of the second portion 222 of the first barrel 220 is finished. The first filter 230 may seal the space surrounded by the first portion 221 and the second portion 222 of the first barrel 220. The incident beam IB may pass through the first filter 230. The first filter 230 may be a band pass filter. More particularly, light in the first wavelength range of the incident beam IB may pass through the first filter 230 with a higher transmittance. A transmittance of the first wavelength range in the first filter 230 may be desirably about 80% or more. However, in embodiments of the inventive concept, the first filter 230 may not be provided.

Although not shown, the light source unit 200 may further include an incident light lens between the light source 210 and the first filter 230. The incident light lens may collect the incident beam IB.

The reaction unit 300 may be provided on the bottom surface 100b of the case 100. The reaction unit 300 may include a kit loading part 310 and a diagnostic kit 320. A slot 311 may be defined in the kit loading part 310. The kit loading part 310 may have a low reflectance and be made of a material without autofluorescence. Particularly, a top surface 310a of the kit loading part 310 may be processed so that light is not reflected or scattered. For example, an anti-reflection coating may be performed on the top surface 310a of the kit loading part 310. Thus, a noise generated during signal measurement may be reduced. The slot 311 may have a height in a third direction D3 less than that of the top surface 310a of the kit loading part 310. The third direction D3 may be perpendicular to each of the first direction D1 and the second direction D2. The slot 311 may be surrounded by the kit loading part 310 and have an opened top surface and one opened side surface. Although one slot 311 is provided in the kit loading part 310 in FIG. 1B, the embodiment of the inventive concept is not limited thereto. For example, a plurality of slots 311 may be provided in the kit loading part 310.

The diagnostic kit 320 may be inserted into the slot 311 in the second direction D2. The diagnostic kit 320 may be inserted to the one opened side surface of the slot 311. For example, a top surface of the diagnostic kit 320 may provide a coplanar surface with the top surface 310a of the kit loading part 310. The diagnostic kit 320 may be made of a paper material. The diagnostic kit 320 may include a plurality of measuring parts 330. Each of the measuring parts 330 may extend in the first direction D1 on the diagnostic kit 320. Each of the measuring parts 330 may have a top surface perpendicular to the third direction D3. The measuring parts 330 may be spaced apart from each other in the second direction D2. The incident beam IB may be incident to an area including all of the measuring parts 330. Thus, a readability of a signal emitted from the measuring parts 330 disposed on an edge may increase. Although the diagnostic kit 320 includes five measuring parts 330 in FIG. 1B, the embodiment of the inventive concept is not limited thereto. For example, the diagnostic kit 320 may include one or more measuring parts 330. The measuring parts 330 may have different targets to be measured from each other. Each of the targets to be measured may include, e.g., a liquid sample such as blood, body fluid, saliva, and urine or a mixed sample thereof. The target to be measured may be a bio-marker. The bio-marker is an indicator capable of objectively measuring and evaluating a biological process, a disease progress situation, and a sensitivity of a drug responsibility with respect to a treatment method. The target to be measured may be labeled by fluorescent dyes, gold nanoparticles, and polymer particles. Desirably, the target to be measured may be labeled by the fluorescent dyes having a low detection limit. The fluorescent dyes may include rare earth elements. For example, the fluorescent dyes may include europium (Eu), samarium (Sm), terbium (Tb), or ruthenium (Ru). The rare earth elements used as the fluorescent dyes may have a great difference between an excitation wavelength and an emission wavelength. For example, in case of the europium (Eu), an excitation wavelength may be about 340 nm, and an emission wavelength may be about 615 nm. As the difference between the excitation wavelength and the emission wavelength increases, signal interference may be reduced, and analysis accuracy may increase.

Although not shown in FIGS. 1A and 1B, the reaction unit 300 may further include microstructures on top surfaces of the measuring parts 330. The microstructures may be arranged in the first direction D1. The microstructures may be spaced apart from each other in the first direction D1. The microstructures arranged in the first direction D1 may provide a microstructure array. A plurality of microstructure arrays may be provided for each of the measuring parts 330. The microstructure arrays may be spaced apart from each other in the second direction D2. The microstructure arrays may have different shapes for each of the measuring parts 330. The target to be measured may be provided on the microstructures. The incident beam IB may be incident to the microstructures, and a reflected beam RB may be emitted in a desired direction according to the shapes of the microstructures. The shapes of the microstructures will be described later with reference to FIGS. 2A to 2E.

The light receiving unit 400 may be provided on the flat surface 102 of the case 100. The light receiving unit 400 may include a plurality of detection parts 410, a second barrel 420, and a second filter 430. The second barrel 420 may include a first portion 421 and a second portion 422. The second barrel 420 may be symmetric with respect to a second axis AX2. The second axis AX2 may be parallel to the third direction D3. The second axis AX2 may extend in the third direction D3 to meet the first axis AX1 on the top surface of the diagnostic kit 320. The first portion 421 may be provided on the flat surface 102. The second portion 422 may be connected to the first portion 421. The second portion 422 may pass through the flat surface 102 and extend in the third direction D3 in parallel to the second axis AX2. The first portion 421 may have a plate shape, and the second portion 422 may have a hollow column shape. The second barrel 420 may have a low reflectance and be made of a material without autofluorescence. Also, the second barrel 420 may have an inner surface that is processed so that light is not reflected or scattered. For example, an anti-reflection coating is performed on the inner surface of the second barrel 420. Thus, the reflected beam RB may have a high uniformity, and a noise generated during signal measurement may be reduced. The second barrel 420 may guide a path of the reflected beam RB. More particularly, as a length of the second portion 422 or a diameter of a space surrounded by the first portion 421 and the second portion 422 is adjusted, a size, shape, and uniformity of the reflected beam RB may be adjusted.

The detection parts 410 may be provided on the first portion 421 of the second barrel 420. The detection parts 410 may be arranged in the first direction D1 on the first portion 421 and each extend in the second direction D2. The detection parts 410 may be provided in the space surrounded by the first portion 421 and the second portion 422. The detection parts 410 may be a CCD image sensor, a CMOS image sensor, a photodiode, a phototransistor, or a photomultiplier. The detection parts 410 may detect signals from different targets to be measured. The reflected beam RB may be incident to different detection parts 410 according to shapes of the microstructures on the top surfaces of the measuring parts 330.

The second filter 430 may be provided at a position at which extension of the second portion 422 of the second barrel 420 is finished. The second filter 430 may seal the space surrounded by the first portion 421 and the second portion 422 of the second barrel 420. The reflected beam RB may pass through the second filter 430. The second filter 430 may be a high pass filter or a band pass filter. More particularly, light in a specific wavelength range of the reflected beam RB may pass through the second filter 430 with a higher transmittance. The specific wavelength range may be a second wavelength range. The second wavelength range may be different according to the kind of the fluorescent material used by the fluorescent signal detection apparatus 10. For example, when the fluorescent signal detection apparatus 10 uses europium (Eu), the second wavelength range may be about 590 nm to about 650 nm. A transmittance of the second wavelength range in the second filter 430 may be desirably about 80% or more.

Although not shown, the light receiving unit 400 may further include a light receiving lens between the detection parts 410 and the second filter 430. The light receiving lens may collect the reflected beam RB.

Figure 2A:
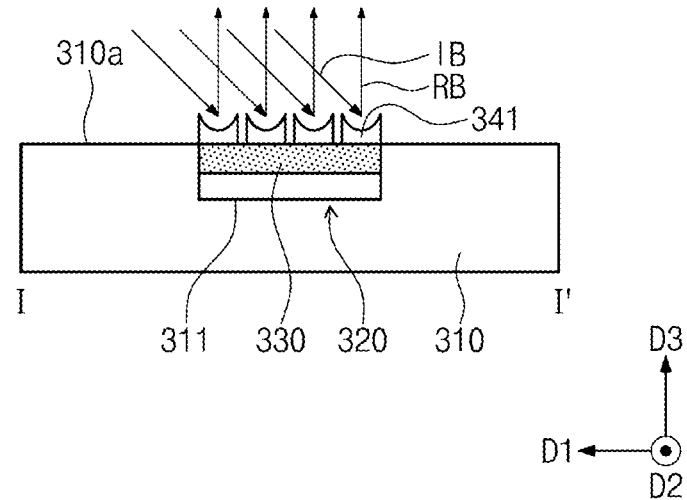
FIGS. 2A and 2E are cross-sectional views taken along line I-I' of FIG. 1B.
Figure 2B:
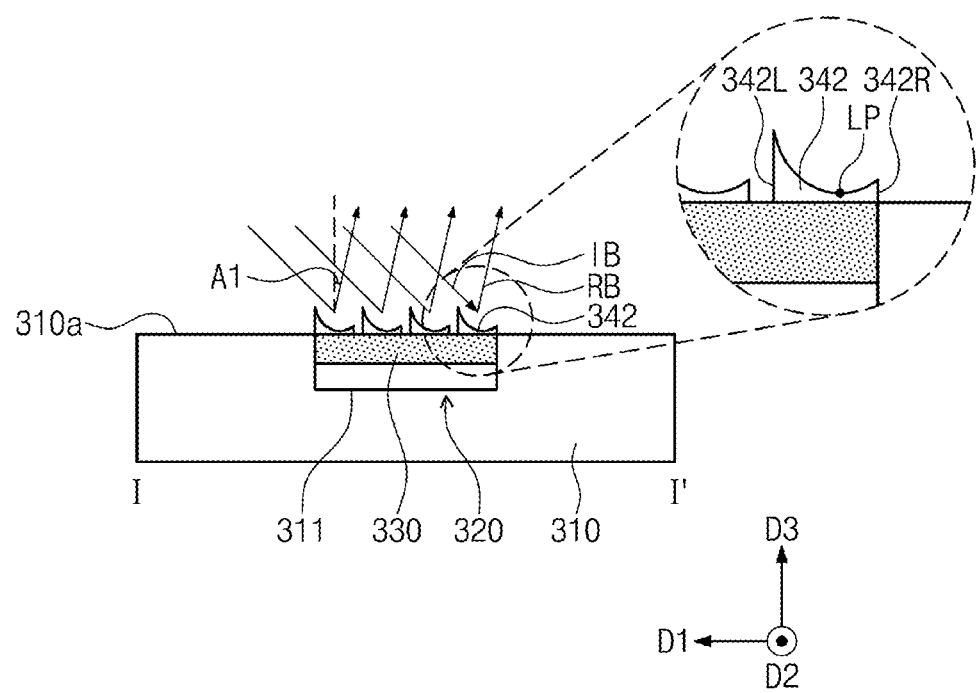
Figure 2C:
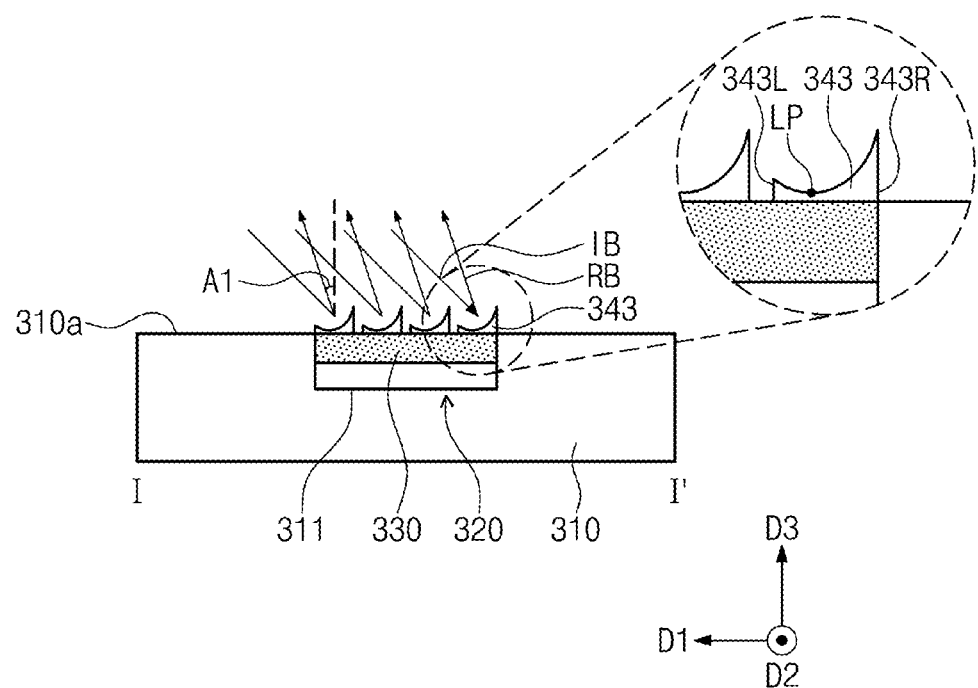
Figure 2D:
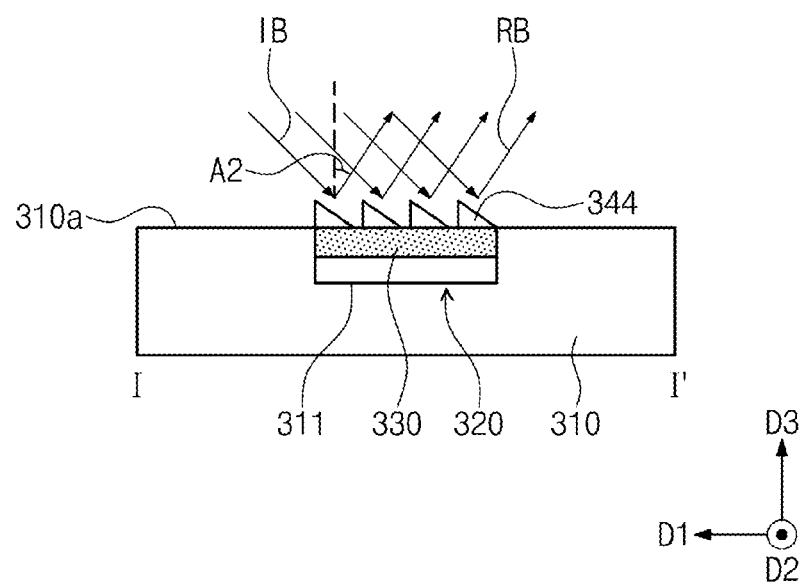
Figure 2E:
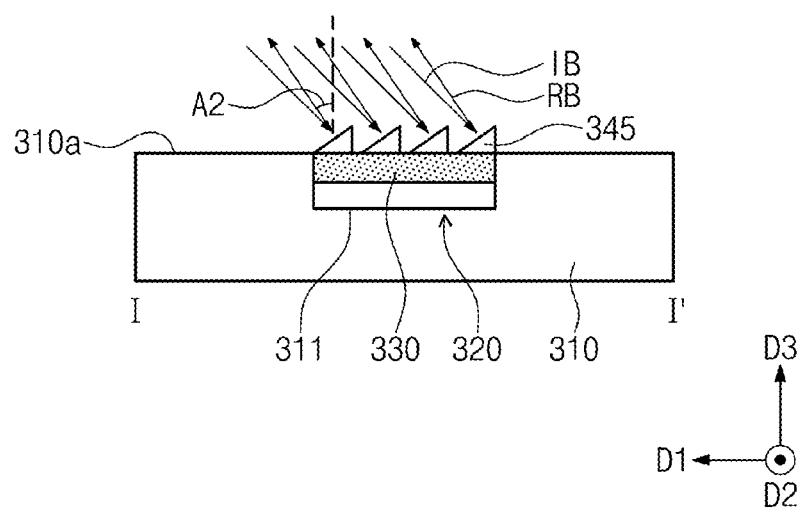

FIGS. 2A and 2E are cross-sectional views taken along line I-I' of FIG. 1B.

Referring to FIG. 2A, a plurality of first microstructures 341 may be provided on a top surface of the measuring part 330. Each of the first microstructures 341 may have a recessed top surface. More particularly, a top surface of each of the first microstructures 341 may have a height in the third direction D3, which is a lowest at a center and gradually increases in the first direction D1 or a direction opposite to the first direction D1. The incident beam IB may be incident to the first microstructures 341 while having a predetermined angle with the top surface 310a of the kit loading part 310. The reflected beam RB may be emitted in parallel to the third direction D3 through the first microstructures 341.

Referring to FIG. 2B, a plurality of second microstructures 342 may be provided on the top surface of the measuring part 330. Each of the second microstructures 342 may include a first side surface 342R and a second side surface 342L that is opposite to the first side surface 342R. The second side surface 342L may have a height in the third direction D3 greater than that of the first side surface 342R. Each of the second microstructures 342 may have a lowest point LP that is closer to the first side surface 342R than the second side surface 342L. The reflected beam RB may be emitted in a direction inclined by a first angle A1 from the third direction D3 through the second microstructures 342.

Referring to FIG. 2C, a plurality of third microstructures 343 may be provided on the top surface of the measuring part 330. Each of the third microstructures 343 may include a first side surface 343R and a second side surface 343L that is opposite to the first side surface 343R. The first side surface 343R may have a height in the third direction D3 greater than that of the second side surface 343L. Each of the third microstructures 343 may have a lowest point LP that is closer to the second side surface 342L than the first side surface 342R. The reflected beam RB may be emitted in a direction inclined by a first angle A1 from the third direction D3 through the third microstructures 343. The direction inclined by the first angle A1 may be opposite to that in FIG. 2B.

Referring to FIG. 2D, a plurality of fourth microstructures 344 may be provided on the top surface of the measuring part 330. Each of the fourth microstructures 344 may have a triangular shape having an inclined top surface. Each of the fourth microstructures 344 may have a height in the third direction D3, which gradually increases in the first direction D1. The reflected beam RB may be emitted in a direction inclined by a second angle A2 from the third direction D3 through the fourth microstructures 344. The second angle A2 may be greater than the first angle A1 in FIGS. 2B and 2C.

Referring to FIG. 2E, a plurality of fifth microstructures 345 may be provided on the top surface of the measuring part 330. Each of the fifth microstructures 345 may have a triangular shape having an inclined top surface. Each of the fifth microstructures 345 may have a height in the third direction D3, which gradually decreases in the first direction D1. The reflected beam RB may be emitted in a direction inclined by a second angle A2 from the third direction D3 through the fifth microstructures 345. The direction inclined by the second angle A2 may be opposite to that in FIG. 2D.

The first to fifth microstructures 341, 342, 343, 344, and 345 described above may be provided to each of the measuring parts 330 in FIG. 1B. Thus, the fluorescent signal detection apparatus according to an embodiment of the inventive concept may simultaneously detect different kinds of targets to be measured.

Figure 3A:
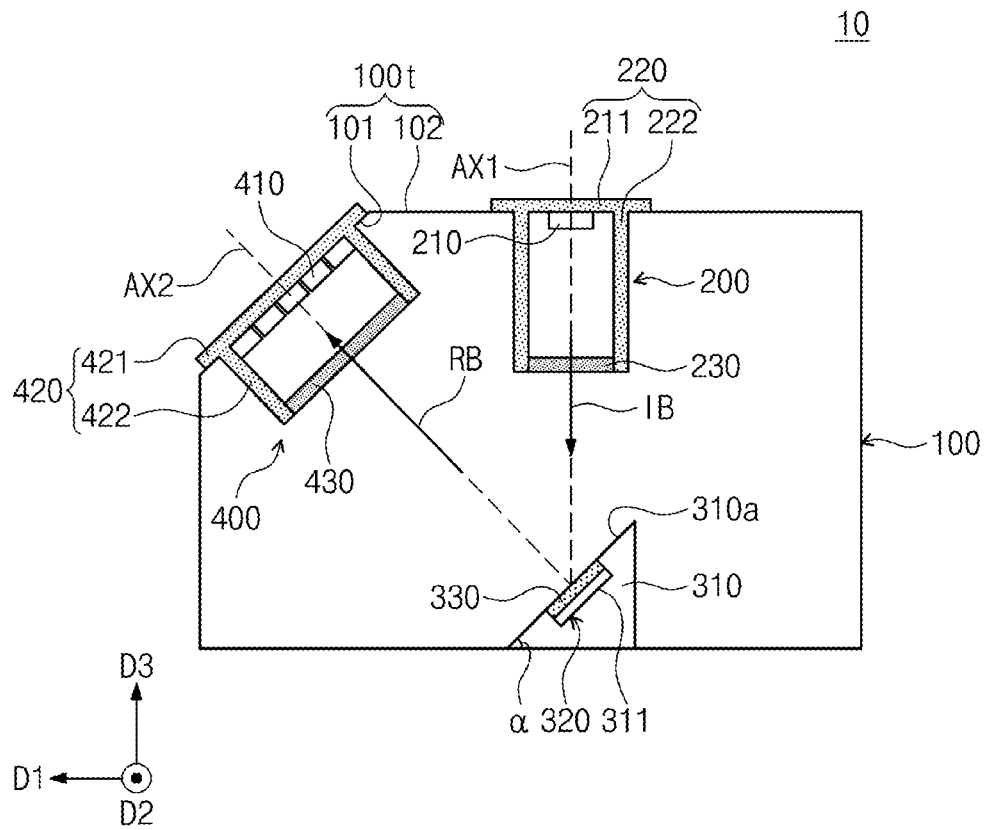
FIG. 3A is a cross-sectional view for explaining a fluorescent signal detection apparatus according to an embodiment of the inventive concept.
Figure 3B:
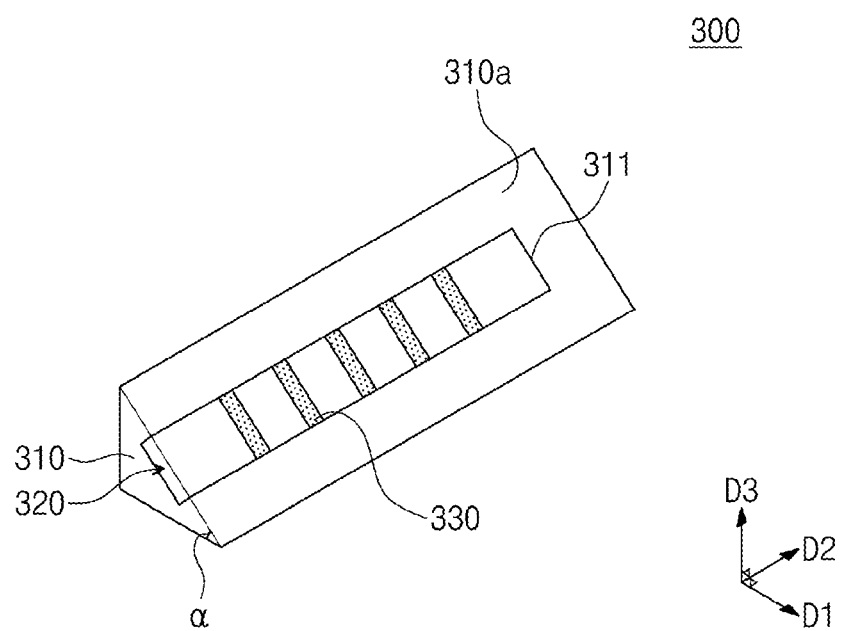
FIG. 3B is a perspective view for explaining a reaction unit of the fluorescent signal detection apparatus according to an embodiment of the inventive concept.

FIG. 3A is a cross-sectional view for explaining a fluorescent signal detection apparatus according to an embodiment of the inventive concept. FIG. 3B is a perspective view for explaining a reaction unit of the fluorescent signal detection apparatus according to an embodiment of the inventive concept. The feature that is substantially the same as that previously described with reference to FIGS. 1A and 1B will be omitted.

Referring to FIGS. 3A and 3B, in a fluorescent signal detection apparatus 20 according to an embodiment of the inventive concept, a light source unit 200 may be provided at a flat surface 102 of a case 100, and a light receiving unit 400 may be provided at an inclined surface 101 of the case 100.

A reaction unit 300 may be provided on a bottom surface 100b of the case 100. The reaction unit 300 may include a kit loading part 310 and a diagnostic kit 320. A top surface 310a of the kit loading part 310 has an inclination angle α with a bottom surface 100b of the case 100. The inclination angle α may be an acute angle. Desirably, the inclination angle α may be about 5° to about 45°. As the top surface 310a of the kit loading part 310 has the inclination angle α, an incident beam IB may be reflected to detection parts 410 of the light receiving unit 400.

Figure 4A:
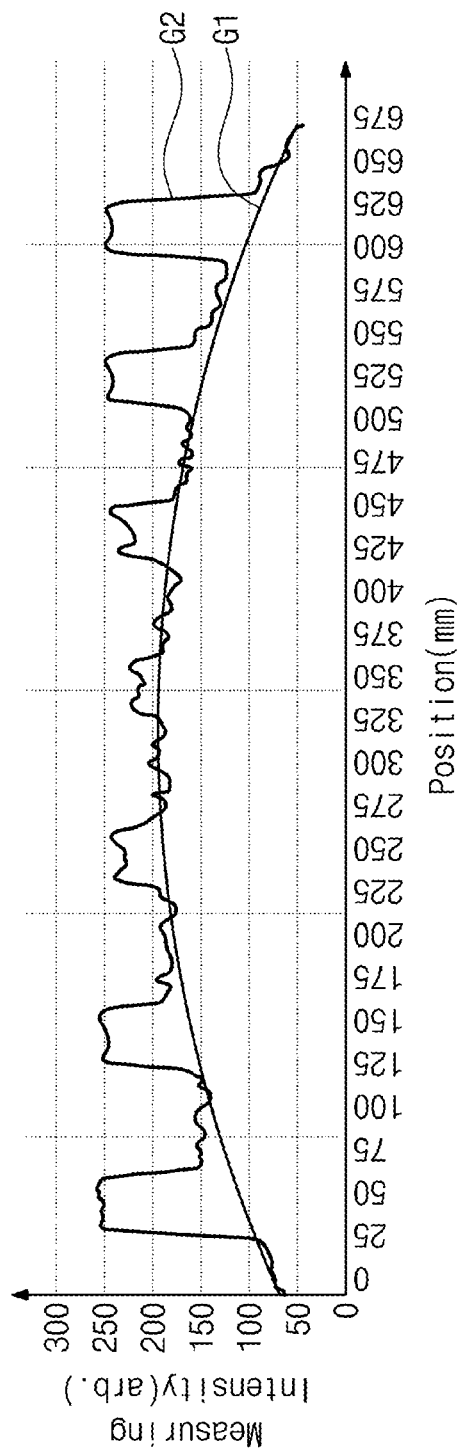
FIGS. 4A and 4B are graphs representing a measuring intensity of a signal according to a position of a diagnostic kit.
Figure 4B:
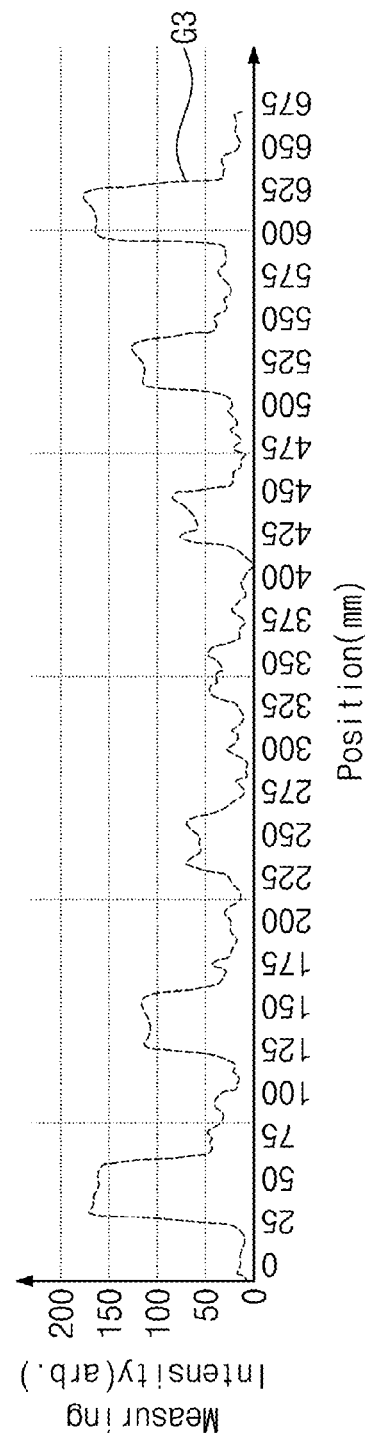

FIGS. 4A and 4B are graphs representing a measuring intensity of a signal according to a position of a diagnostic kit. The graphs are measured results using a light source of 3 W 365 nm LED. Referring to FIGS. 1B and 3B, a horizontal axis represents a position in the second direction D2 on the diagnostic kit 320, and a vertical axis represents a measuring intensity of a signal at each position.

Referring to FIG. 4A, a first line G1 represents a measuring intensity of an own incident beam emitted from a light source, and a second line G2 represents a measuring intensity of a fluorescent signal. The first line G1 may represent a gaussian distribution. The first line G1 may have a measuring intensity that is great at a center of the diagnostic kit and gradually decreases in a direction toward both ends of the diagnostic kit. The second line G2 may include a plurality of peaks. Each of the peaks may represent a fluorescent signal emitted from the measuring parts on the diagnostic kit. A difference between the first line G1 and a maximum point of each of the peaks may be small at the center of the diagnostic kit and gradually increase in the direction toward the both ends of the diagnostic kit.

Referring to FIG. 4B, a third line G3 represents a difference between measuring intensities of the second line G2 and the first line G1 in FIG. 4A. The third line G3 may include a plurality of peaks. The peaks of the third line G3 may correspond to the peaks of the second line G2 in FIG. 4A. That is, an intensity of the maximum point of each of the peaks may be small at the center of the diagnostic kit and gradually increase in the direction toward the both ends of the diagnostic kit. The fluorescent signal emitted from the target to be measured provided to the measuring parts through the third line G3 may be quantified.

Figure 5:
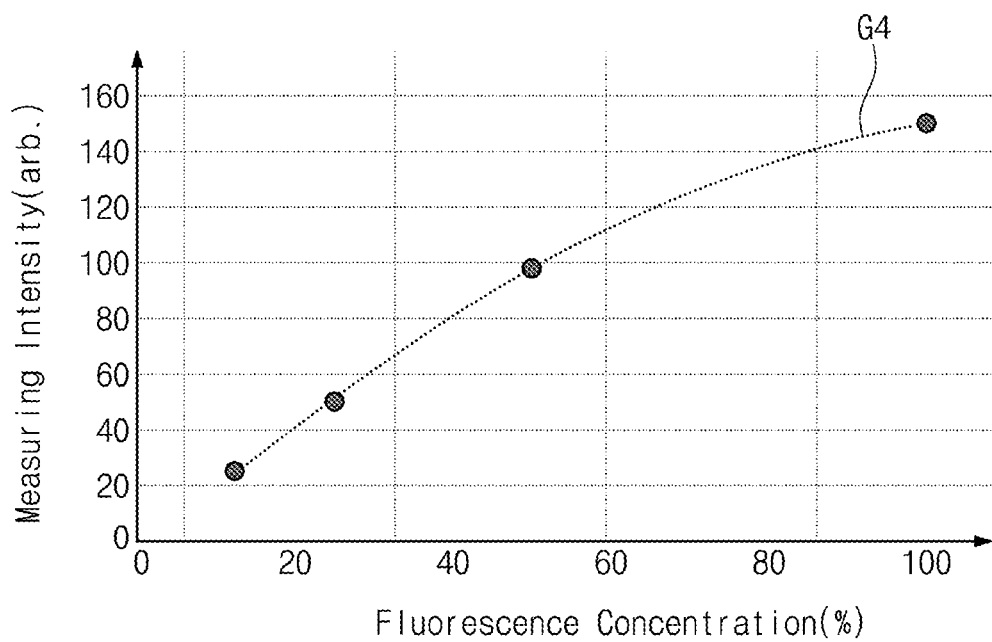
FIG. 5 is a graph representing a measuring intensity of a signal according to a fluorescence concentration.

FIG. 5 is a graph representing a measuring intensity of a signal according to a fluorescence concentration.

Referring to FIG. 5, a fourth line G4 represents a measuring intensity of a signal according to a fluorescence concentration. The fourth line G4 represents that linearity between the fluorescence concentration and the measuring intensity of the signal may be secured. In the fourth line G4, a coefficient of determination ($R^2$) may have a value of about 0.9995.

Figure 6:
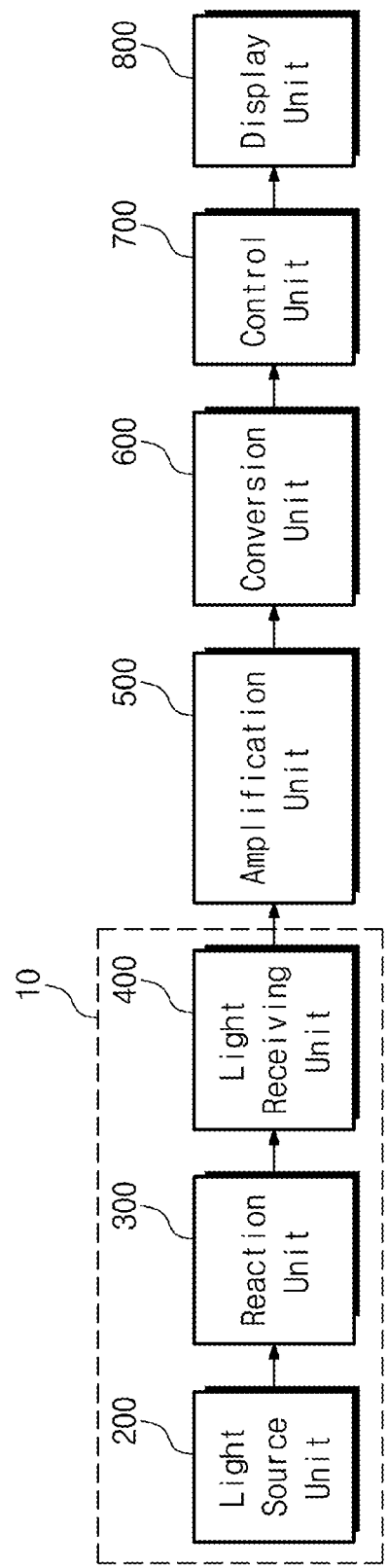
FIG. 6 is a schematic block diagram representing an information processing system including a fluorescent signal detection apparatus according to an embodiment of the inventive concept.

FIG. 6 is a schematic block diagram representing an information processing system including a fluorescent signal detection apparatus according to an embodiment of the inventive concept.

Referring to FIG. 6, the information processing system including a fluorescent signal detection apparatus may include a fluorescent signal detection apparatus 10, an amplification unit 500, a conversion unit 600, a control unit 700, and a display unit 800. The fluorescent signal detection apparatus 10 may include the light source unit 200, the reaction unit 300, and the light receiving unit 400, which are described with reference to FIGS. 1A and 1B. The amplification unit 500 may amplify a signal of the light receiving unit 400. The amplification unit 500 may transmit the amplified signal to the conversion unit 600. The conversion unit 600 may convert an analog signal amplified by the amplification unit 500 into a digital signal. The conversion unit 600 may be, e.g., an analog to digital converter (ADC). The conversion unit 600 may transmit the digital signal to the control unit 700. The control unit 700 may analyze and process the digital signal converted by the conversion unit 600. Also, the control unit 700 may store the digital signal in a type of a command, a program, or an algorithm. Also, the control unit 700 may transmit the processed digital signal to the display unit 800. The control unit 700 may include, e.g., a central processing unit (CPU), a micro processing unit (MPU), or a micro controlling unit (MCU). Also, the control unit 700 may further include a memory and an input and output module. The memory may include a random access memory (RAM), a read only memory (ROM), an erasable programmable ROM (EPROM), an electrically EPROM (EEPROM), and a flash memory. Also, the control unit 700 may be connected to the internet through wireless communication. Thus, the fluorescent signal detection apparatus 10 according to an embodiment of the inventive concept may further include a mobile communication unit transmitting data, which is analyzed and processed in the control unit 700, to a remote terminal. That is, the internet of things (IoT) technology may be applied to the fluorescent signal detection apparatus 10 according to an embodiment of the inventive concept. The display unit 800 may display information transmitted from the control unit 700 through a display apparatus.

The fluorescent signal detection apparatus according to the embodiments of the inventive concept may be carried out by including miniaturized and simplified components, and thus easily and rapidly used by everyone.

Also, the fluorescent signal detection apparatus according to the embodiments of the inventive concept may quantitatively measure various bio-markers related to diseases through a fluorescent signal.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Thus, the above-disclosed embodiments are to be considered illustrative and not restrictive.

What is claimed is:

1. A fluorescent signal detection apparatus comprising:
a reaction unit comprising a kit loading part in which a diagnostic kit is inserted to one area;
a light source unit comprising a light source and a first barrel configured to surround the light source;
a light receiving unit comprising a detection part and a second barrel configured to surround the detection part; and
a case configured to surround the reaction unit, the light source unit, and the light receiving unit, wherein the diagnostic kit comprises measuring parts and microstructures configured to accommodate a target to be measured, the target is labeled by a fluorescent dye, and the microstructures are provided on the measuring parts, and wherein the case comprises a top surface and a bottom surface opposite to the top surface, the top surface comprises a flat surface and an inclined surface connected to the flat surface, and one of the light source unit and the light receiving unit is provided at the inclined surface.

2. The fluorescent signal detection apparatus of claim 1, wherein the measuring parts each extend in a first direction, and are spaced apart from each other in a second direction perpendicular to the first direction, and the microstructures have different shapes for each of the measuring parts.

3. The fluorescent signal detection apparatus of claim 2, wherein the detection part is provided in plurality, and the plurality of detection parts are spaced apart from each other in the first direction.

4. The fluorescent signal detection apparatus of claim 1, wherein the light receiving unit is provided in a direction perpendicular to a top surface of the diagnostic kit.

5. The fluorescent signal detection apparatus of claim 1, wherein the light receiving unit is provided at the inclined surface, and each of a top surface of the diagnostic kit and a top surface of the kit loading part has an inclination angle with the bottom surface of the case.

6. The fluorescent signal detection apparatus of claim 5, wherein the inclination angle is about 5° to about 45°.

7. The fluorescent signal detection apparatus of claim 1, further comprising at least one of a first filter in the first barrel and a second filter in the second barrel.

8. The fluorescent signal detection apparatus of claim 7, wherein the second filter is one of a high pass filter configured to transmit light having a wavelength of about 590 nm or more and a band pass filter configured to transmit light having a wavelength of about 590 nm to about 650 nm.

9. The fluorescent signal detection apparatus of claim 1, further comprising:
    an amplification unit configured to amplify an analog signal incident to the light receiving unit;
    a conversion unit configured to convert the analog signal into a digital signal;
    a control unit configured to control the digital signal; and
    a display unit configured to display the digital signal.

* * * * *